(12) United States Patent
Bucknor et al.

(10) Patent No.: US 11,780,421 B2
(45) Date of Patent: Oct. 10, 2023

(54) MOTOR AND TORQUE CONVERTER CLUTCH CONTROL STRATEGY FOR ELECTRIC DRIVE UNIT HAVING MOTOR-DRIVEN TORQUE CONVERTER

(71) Applicant: GM GLOBAL TECHNOLOGY OPERATIONS LLC, Detroit, MI (US)

(72) Inventors: Norman K. Bucknor, Troy, MI (US); Chunhao J. Lee, Troy, MI (US); Dongxu Li, Troy, MI (US); Lei Hao, Troy, MI (US); Chengwu Duan, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 17/562,169

(22) Filed: Dec. 27, 2021

(65) Prior Publication Data

US 2023/0166710 A1 Jun. 1, 2023

(30) Foreign Application Priority Data

Nov. 30, 2021 (CN) .......................... 202111444464.8

(51) Int. Cl.
*F16H 45/02* (2006.01)
*B60W 10/02* (2006.01)
(Continued)

(52) U.S. Cl.
CPC .......... *B60W 10/026* (2013.01); *B60W 10/024* (2020.02); *B60W 10/08* (2013.01); *B60W 50/06* (2013.01); *F16H 45/02* (2013.01); *B60W 30/18027* (2013.01); *B60W 2510/083* (2013.01);
(Continued)

(58) Field of Classification Search
CPC ... B60W 10/026; B60W 10/024; B60W 10/08; B60W 50/06; B60W 30/18027; B60W 2510/083; B60W 2510/1015; B60W 2520/04; B60W 2520/105; B60W 2540/10; B60W 2710/024; B60W 2710/081; B60W 2710/083
See application file for complete search history.

(56) References Cited

U.S. PATENT DOCUMENTS 3,915,251 A  10/1975 Kassekert et al.
9,493,168 B1* 11/2016 Kim et al. ...... B60W 30/18072
(Continued)

FOREIGN PATENT DOCUMENTS

DE       19729382 A1   1/1999
DE    102018204389 A1  10/2018

*Primary Examiner* — Charles A Fox
*Assistant Examiner* — Farhana Pervin
(74) *Attorney, Agent, or Firm* — Quinn IP Law (57) ABSTRACT

A method for controlling an electric drive unit (EDU) having a motor-driven torque converter includes receiving a request signal indicative of a requested output torque of the EDU, and operating the motor at a target motor speed using the requested output torque. The target motor speed minimizes system losses while achieving the requested output torque. When the requested output torque remains below a calibrated threshold and a turbine speed is less than a corner speed of the motor, a torque converter clutch (TCC) transitions to or remains in a locked state. The controller commands the TCC to transition to an unlocked state to reach the target motor speed, thereby selectively enabling torque multiplication. A powertrain system includes a driven load and the EDU. A computer readable storage medium may include executable instructions for performing the method.

20 Claims, 7 Drawing Sheets

(51) Int. Cl.
*B60W 50/06* (2006.01)
*B60W 10/08* (2006.01)
*B60W 30/18* (2012.01)

(52) U.S. Cl.
CPC ... *B60W 2510/1015* (2013.01); *B60W 2520/04* (2013.01); *B60W 2520/105* (2013.01); *B60W 2540/10* (2013.01); *B60W 2710/024* (2013.01); *B60W 2710/081* (2013.01); *B60W 2710/083* (2013.01); *F16H 2045/0215* (2013.01)

(56) References Cited

U.S. PATENT DOCUMENTS

| | | | |
|---|---|---|---|
| 10,576,837 B2 | 3/2020 | Li et al. | |
| 10,676,079 B1* | 6/2020 | Bucknor et al. | B60W 20/10 |
| 10,967,865 B2* | 4/2021 | Zhao et al. | B60W 10/06 |
| 2013/0292195 A1* | 11/2013 | Gibson et al. | F01P 3/00 |
| | | | 180/53.1 |
| 2015/0072829 A1* | 3/2015 | Michikoshi et al. | B60W 20/40 |
| | | | 180/65.265 |
| 2016/0297419 A1* | 10/2016 | Zhang et al. | B60W 10/026 |
| 2017/0327005 A1* | 11/2017 | Meyer et al. | B60L 15/2063 |
| 2019/0031180 A1* | 1/2019 | Lee et al. | B60K 6/48 |
| 2021/0122354 A1* | 4/2021 | Robison et al. | B60W 20/11 |
| 2021/0171006 A1* | 6/2021 | Syed et al. | B60W 10/026 |

* cited by examiner

MOTOR AND TORQUE CONVERTER CLUTCH CONTROL STRATEGY FOR ELECTRIC DRIVE UNIT HAVING MOTOR-DRIVEN TORQUE CONVERTER

CROSS-REFERENCE TO RELATED APPLICATIONS

This application claims priority to and the benefit of Chinese Patent Application No. 202111444464.8, which was filed on Nov. 30, 2021, and which is hereby incorporated by reference in its entirety.

INTRODUCTION

Powertrain systems are equipped with one or more torque actuators. When the powertrain system is configured for use aboard a mobile system, for instance, output torque provided by the various torque actuators is used for locomotion. In such a case, the individual torque actuators act as a collective set of propulsion actuators. Electric vehicles, robots, and other mobile platforms may include an electric drive unit (EDU) in which motor output torque from one or more electric traction motors is directed to a set of road wheels. Stationary systems may use a similar EDU for other beneficial purposes, e.g., to rotate a drive belt when powering a driven load or when generating electricity.

Electric traction motors, electric generators, and other rotary electric machines are capable of producing relatively high levels of output torque at low rotary speeds, e.g., relative to low-speed torque generating capabilities of an internal combustion engine. However, the relative speed-torque performance advantages of electric machines are substantially lessened at higher rotary speeds. The output power capability of an electric traction motor is equal to the product of its output torque and speed. Traditionally, therefore, electric traction motors have been sized to provide sufficient output power capability for a particular application. As an alternative solution, an electrically-powered hydrodynamic torque converter may be used to boost the torque and power output of an electric traction motor, thereby avoiding the need for oversizing the motor.

SUMMARY

The present disclosure pertains to the real-time control of a powertrain system of a motor vehicle. The powertrain system includes an electric traction motor ("motor") and a hydrodynamic torque converter assembly ("torque converter"). The torque converter includes an input member in the form of an impeller, also referred to hereinafter as a pump, which in the present implementations is connected to a rotor shaft or other output member of the motor such that the torque converter is "motor-driven" within the scope of the disclosure. The torque converter also includes a stator, an output member in the form of a transmission-connected turbine, and a torque converter clutch (TCC). The TCC is operable for selectively locking the pump to the turbine to allow the pump and turbine to rotate together in unison, i.e., at the same speed/without slip. The torque converter includes an output member such as a turbine shaft that drivingly connects to a rotatable input member of a transmission to thereby transfer torque from the motor to the transmission.

As appreciated by those skilled in the art, torque converter assemblies are typically equipped with a TCC acting as an internal lockup clutch mechanism. The TCC is selectively applied to rigidly connect one rotating member to another when the respective rotational speeds are nearly equal. Methods described below are used to regulate a rotary speed ("motor speed") of the electric traction motor, as well as a locked/unlocked apply state of the TCC, with a powertrain control module or other system controller performing the method in a coordinated motor/pump acceleration profile-based manner that minimizes overall system losses.

An aspect of the disclosure includes a method for controlling an electric drive unit (EDU) of a motor vehicle. The EDU includes a torque converter connected to an electric traction motor, such that a pump of the torque converter is driven by an output member of the electric traction motor. The method according to an embodiment includes receiving, via a controller, a request signal indicative of a requested output torque of the EDU The method also includes accelerating the motor to a target motor speed at a calibrated speed profile, with the calibrated speed profile corresponding to a predetermined vehicle acceleration rate. The calibrated speed profile and the target motor speed are configured to minimize total system losses of the EDU while achieving the requested output torque.

When the predetermined vehicle acceleration rate remains below a calibrated acceleration threshold and a turbine speed of a turbine of the torque converter is less than a corner speed of the electric traction motor, the method includes commanding the TCC to transition to or remain in a locked state. The method also includes commanding the TCC to transition to an unlocked state to reach the target motor speed, thereby selectively enabling multiplication of an input torque from the electric traction motor when operating at the target motor speed. As appreciated in the art, the term "corner speed" as used herein is the particular rotational speed at which the motor reaches its maximum power.

The target motor speed used herein may correspond to an actual output torque that is achievable by the torque converter when the TCC is in the unlocked state being equal to an actual output torque achievable by the torque converter when the TCC is in a locked state.

In some embodiments, the disclosed motor vehicle includes an accelerator pedal having, a measurable pedal position, in which case receiving the request signal includes receiving a pedal position signal indicative of a percentage of apply force or travel of the accelerator pedal. The method may include extracting the target motor speed from a lookup table indexed by the pedal position or apply force.

When the TCC is in the locked state, the method may further include applying a vehicle acceleration-based hysteresis band that is operational below a predetermined rotational speed of the electric traction motor. This action is performed to prevent the TCC from transitioning from the locked state to the unlocked state while the motor operates to produce vehicle acceleration levels within the hysteresis band.

The EDU in some implementations may be used to power a vehicle propulsion function. In such a representative use case, the method may further include determining if the motor vehicle is stationary or moving, and then ramping a rotary speed of the torque converter pump to the target motor speed at a first rate or a second rate depending on whether the motor vehicle is stationary or moving, respectively.

When the motor vehicle is stationary, the method may include ramping the rotary speed of the pump to the target motor speed at the first rate, with the first rate being calibrated maximum acceleration rate of the electric traction motor. When the motor vehicle is moving, the method may include ramping the rotary speed of the pump to the target motor speed at the second rate. The second rate, which is less than the first rate, is limited by an available battery power level of a propulsion battery connected to the electric traction motor.

In another aspect of the disclosure, the method may include maintaining the TCC in the locked state when the electric traction motor operates below a peak motor torque, and unlocking the TCC when the requested output torque exceeds the peak motor torque.

Also disclosed herein is a powertrain system having an EDU and a driven load. The EDU includes an electric traction motor operatively connected to the driven load, and a torque converter having a pump and a turbine, with the pump being connected to and driven by the motor. A controller is in communication with the motor and the torque converter. The controller is configured to execute the above-summarized method.

Additionally, a computer-readable storage medium is disclosed on which instructions are recorded for controlling the EDU. Execution of the instructions by a processor causes the processor to receive a request signal indicative of a requested output torque of the EDU, and to accelerate the motor to a target motor speed for a predetermined vehicle acceleration rate. Execution of the instructions also causes the processor to command the TCC to transition to or remain in a locked state when the predetermined vehicle acceleration rate remains below a calibrated acceleration threshold and a turbine speed of the torque converter is less than a corner speed of the electric traction motor. The processor also commands the TCC to transition to an unlocked state upon reaching the target motor speed, thereby selectively enabling multiplication of an input torque from the electric traction motor when operating above the target motor speed.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 1:
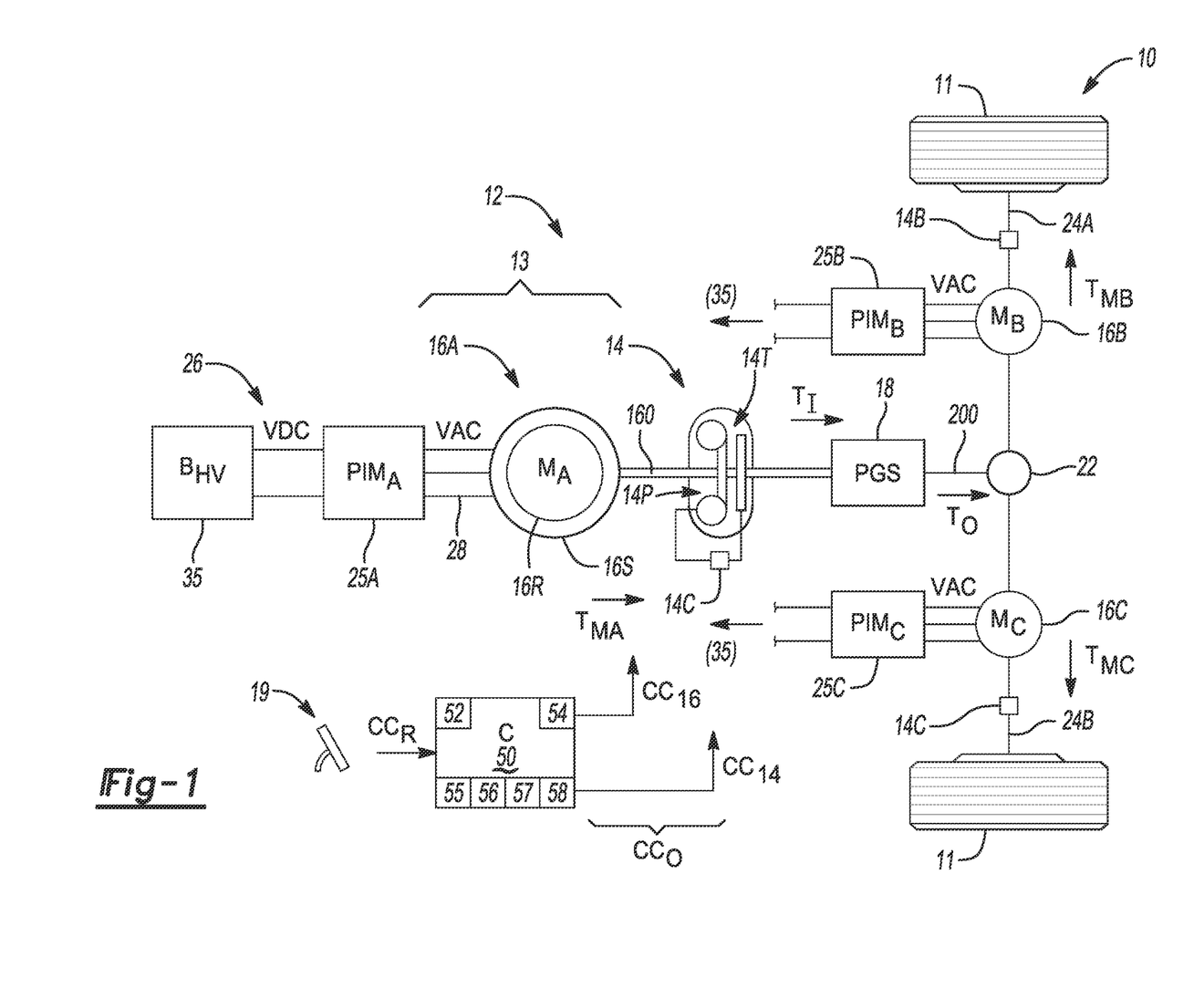
FIG. 1 is a schematic illustration of a representative electrified powertrain system having a motor-driven torque converter and an electronic controller configured to regulate a rotary speed of the motor and an ON/OFF apply state of a torque converter clutch of the torque converter.

Referring to the drawings, wherein like reference numbers refer to like features throughout the several views, and beginning with FIG. 1, a motor vehicle 10 includes a powertrain system 12. The powertrain system 12 in the depicted representative configuration and similar configurations may be used in other types of systems, including but not limited to mobile platforms, robots, or stationary powerplants, and therefore the embodiment of FIG. 1 is intended to be illustrative of just one possible beneficial application. In the depicted exemplary embodiment, the motor vehicle 10 includes one or more driven/powered road wheels 11 in rolling contact with a road surface (not shown). The actual number of road wheels 11 used on a given construction of the motor vehicle 10 may vary, with as few as one road wheel 11 being possible in the context of, e.g., a motorcycle, scooter, trike, or electric bike ("e-bike"), and with more than the illustrated number of road wheels 11 being possible in other configurations, such as but not limited to four-wheel drive or all-wheel drive vehicles, trucks, etc.

Figure 1A:
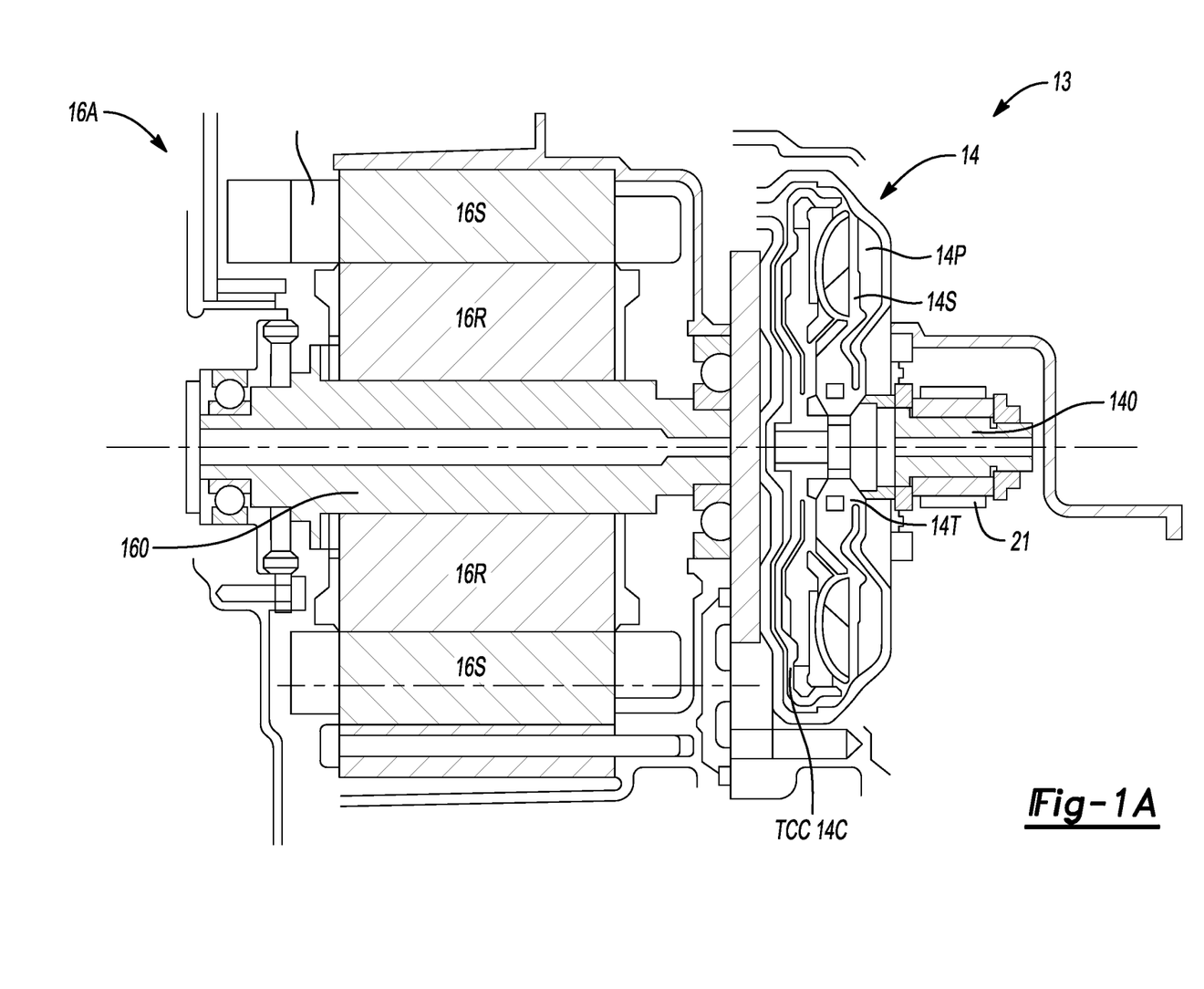
FIG. 1A is a partial section view of a representative electric drive unit (EDU) usable as part of the powertrain system shown in FIG. 1.

As described in detail herein, the powertrain system 12 includes an electronic controller (C) 50, e.g., a powertrain control system. The controller 50 automatically regulates operation of the powertrain system 12, and in particular that of an electric drive unit (EDU) 13 thereof. The EDU 13, an example embodiment of which is depicted in FIG. 1A, in turn includes a hydrodynamic torque converter 14, a pump 14P of which in turn is driven as an input of the torque converter 14 via an electric traction motor ($M_A$) 16A, with the latter being operable by converting stored electrical power into rotational mechanical torque as appreciated in the art. That is, an output member 160 of the motor 16A, such as a rotor shaft, is drivingly connected with the torque converter 14, with generated rotation of a rotor 16R of the motor 16A ultimately causing the rotation of the pump 14P. Fluidic coupling of the pump 14P with an oppositely disposed turbine 14T of the torque converter 14, through an intervening stator 14S (see FIG. 1A), ultimately generates a variable input torque (arrow $T_I$) to a transmission (PGS) 18, with "PCS" in this instance referring to a planetary gear set or another suitable torque transfer mechanism. Output torque (arrow $T_O$) from the transmission 18 is then transmitted via an output shaft 200 of the transmission 18 to one or more of the road wheels 11, e.g., via an electronic or mechanical differential 22.

Referring briefly to FIG. 1A, a representative configuration the EDU 13 includes the electric traction motor 16A being coupled to the torque converter 14. The motor 16A includes a rotor 16R fixed for rotation about the output member 160. Accordingly, the motor 16A may selectively drive the output member 160 or generate electrical power from rotation thereof, e.g., during coasting of the motor vehicle 10. The output member 160 of FIG. 1A is fixed to the torque converter 14 at an end opposite the motor 16A, such that rotation of the output member 160 turns the pump 14P which drives the turbine 14T via a fluid coupling effect, as appreciated in the art. A disconnect clutch (not shown) is disposed inside of the torque converter 14 between the pump 14P and a housing of the torque converter 14, as appreciated in the art, with the disconnect clutch selectively locking the pump 14P, housing, and output member 160 together for common rotation. While omitted for illustrative clarity and simplicity, the EDU 13 typically includes a hydraulic pump or other actuation means for pressurizing such a disconnect clutch, as well as the torque converter clutch (TCC) 14C described below.

The torque converter 14 is configured to facilitate flow of fluid therewithin when managing the degree of fluid coupling between the pump 14P and the turbine 14T. To that end, the torque converter 14 includes a stator 14S formed within the torque converter 14 for selectively coupling the pump 14P and turbine 14T for common rotation. The stator 14S alters the flow of fluid between the pump 14P and the turbine 14T, such that returning fluid aids rotation of the pump 14P, thus enabling the stator 14S to multiply torque from the motor 16A. Additionally, the torque converter 14 includes the TCC 14C, also shown schematically in FIG. 1, which is operable for selectively locking the pump 14P and turbine 14T together for common slip-free rotation. This occurs under the times and conditions detailed below with reference to FIGS. 2-6. The various internal components of the torque converter 14 are housed within and protected by a fluid-tight, annular "pancake" housing, as appreciated in the art, with a pump cover fixedly attached to a turbine cover (not shown), such that a hydraulic fluid chamber within the torque converter 14 is formed therebetween.

As appreciated in the art, the torque converter 14 of FIGS. 1 and 1A selectively multiplies torque from the electric traction motor 16A via fluid coupling of the pump 14P and turbine 14T. Accordingly, selective torque multiplication allows the use of a relatively small motor 16A when compared with a competing powertrain system lacking the torque converter 14. The EDU 13 may provide rotational output, e.g., via an output shaft 140 driven by the turbine 14T. For instance, the output shaft 140 may be directly connected to the turbine 14T, or the output shaft 140 may be used to drive the transmission 18 of FIG. 1, a vehicle drivetrain, final drive unit, or the like, e.g., by way of at least one gear 21 disposed at an end of the output shaft 140.

Referring again to FIG. 1, as part of the present control strategy the controller 50 is operable for selectively locking the pump 14P to the turbine 14T via the TCC 14C. As part of this effort, the method 100 (see FIG. 4) and associated hardware solutions described below are used by the controller 50 to regulate a rotary speed ("motor speed") of the electric traction motor 16A, as well as a locked/unlocked apply state of the TCC 14C.

To that end, as part of its ongoing monitoring and control efforts, the controller 50 is configured to receive a request signal (arrow $CC_R$), itself indicative of a requested output torque and corresponding speed of the powertrain system 12, inclusive of the EDU 13. In the embodiment of FIG. 1 in which the powertrain system 12 is used aboard a motor vehicle 10, the request signal (arrow $CC_R$) may be provided by or measured on an accelerator pedal 19. Thus, the act of receiving the request signal (arrow $CC_R$) may include receiving an electronic pedal position signal, such as a proportional voltage signal, indicative of a percentage of apply force or travel of the accelerator pedal 19 as described below. The controller 50 responds to the request signal (arrow $CC_R$) via a set of output signals (arrow $CC_O$), with the set of output signals (arrow $CC_O$) being inclusive of a motor control signal (arrow $CC_{16}$) and a torque converter control signal (arrow $CC_{14}$).

Figure 3:
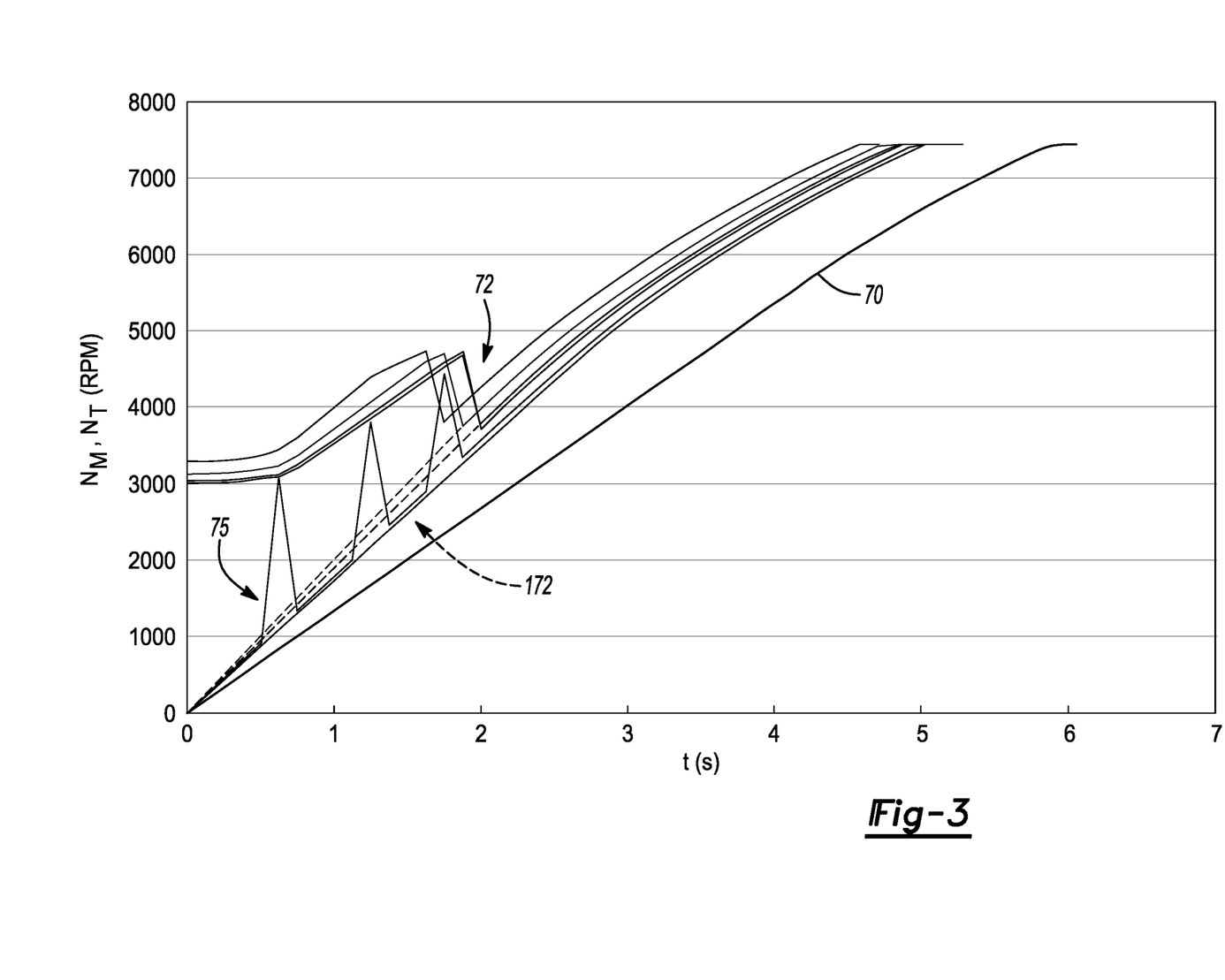
FIG. 3 is a time plot of representative motor and turbine speeds, with time in seconds depicted on the horizontal axis and motor speed in RPM depicted on the vertical axis.
Figure 4:
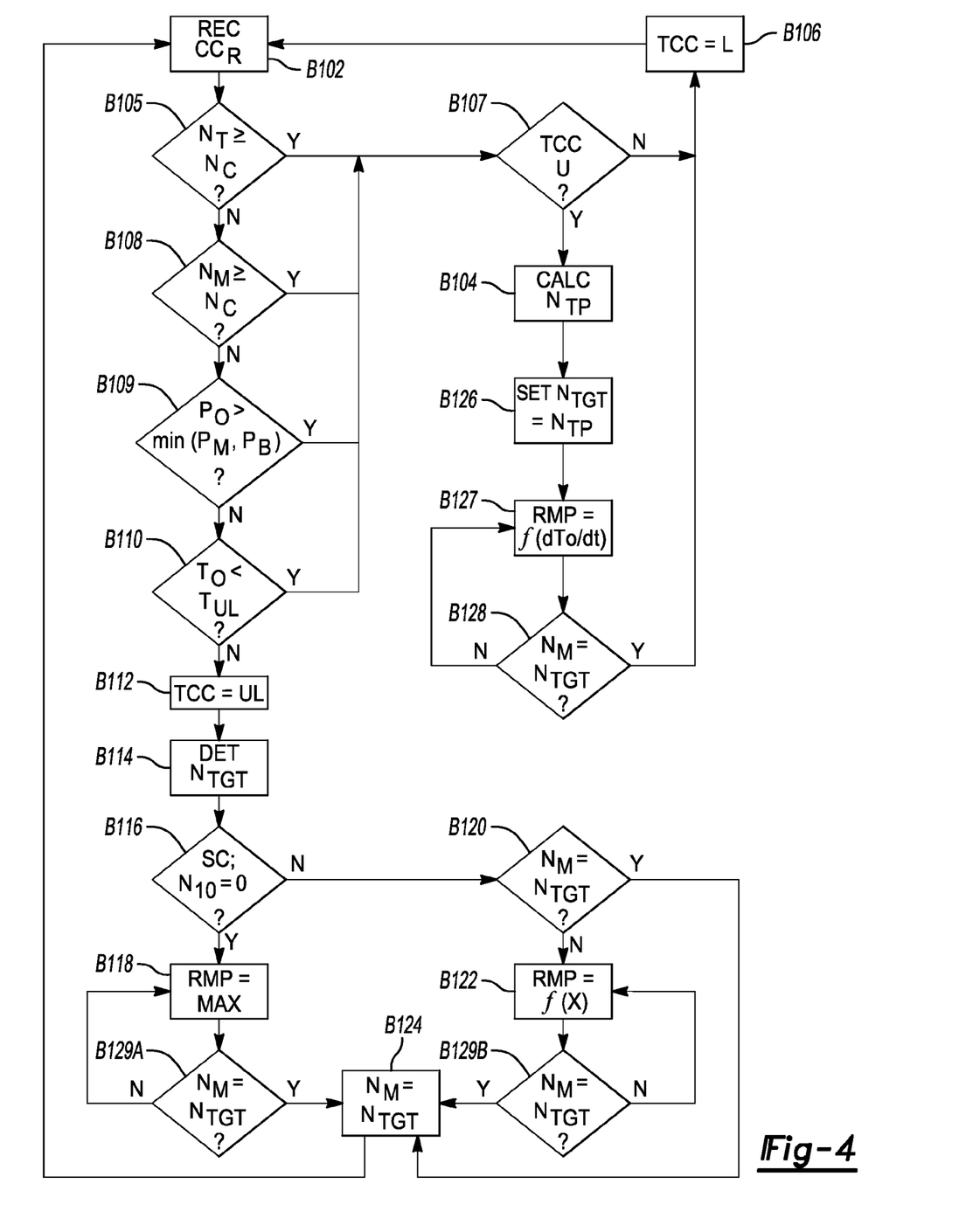
FIG. 4 is a flow chart describing an embodiment of the present method.

The constituent process blocks of the method 100 of FIG. 4 may be programmed as computer-readable instructions in the form of an algorithm, with such an algorithm being executable by a processor 52 of the controller 50, from memory 54 thereof, during ongoing operation of the motor vehicle 10, i.e., in real-time when the motor vehicle 10 operates in a drive mode. In this manner, the controller 50 is able to optimize efficiency of the EDU 13 by minimizing losses therein during a wide range of possible acceleration events, some of which correspond to sufficient power reserves of the motor 16A and others requiring selective boost from the torque converter 14 as detailed below. Exemplary parameters for control of the motor 16A and the TCC 14C of FIGS. 1 and 1A are shown in FIGS. 2, 3, and 5-6 and described below. For simplicity, the parameters are represented numerically in FIG. 1 as a corner speed 55 (also abbreviated below as $N_C$), one or more predetermined vehicle acceleration rates 56, a calibrated acceleration threshold 57, and a hysteresis band 58.

In the illustrated representative configuration of FIG. 1, the electric traction motor 16A includes the stator 16S being spaced a short distance apart from the rotor 16R. The particular construction of the rotor 16R may vary based on the configuration of the motor 16A, with permanent magnet or induction rotors being two possible embodiments. In the exemplary embodiment of FIG. 1, the motor 16A is a polyphase/alternating current (AC) traction or propulsion motor used for generating a motor output torque (arrow $T_{MA}$). The motor output torque (arrow $T_{MA}$) is ultimately transmitted to the torque converter 14 via the output member 160 as noted above, with an input torque (arrow $T_I$) to the transmission 18 and/or another coupled load thereafter provided via the torque converter 14.

Aboard the motor vehicle 10, the coupled load may include one or more of the road wheel(s) 11, and/or one or more drive axles 24A and/or 24B connected thereto. The output member 160 may be variously embodied as a rotatable gear set, a shaft, or another suitable mechanical coupling mechanism. The road wheels 11 in the illustrated use case may be configured as front and/or rear road wheels 11 in different embodiments. Where a single traction motor 16A is used, a differential 22 may be connected to the output shaft 200 of the transmission 18 and used to direct or vector torque as needed to the road wheels 11 disposed on the drive axles 24A and 24B.

Still referring to FIG. 1, the electric traction motor 16A may operate as the sole electric propulsion source aboard the motor vehicle 10 in some implementations. Alternatively, the drive axles 24A and 24B may be individually powered by a corresponding motor ($M_B$ and $M_C$) 16B and 16C, possibly smaller or of a lower voltage capability than the motor 16A. In such a configuration, motor output torque (arrow $T_{MB}$ or $T_{MC}$) may be generated and delivered to a corresponding drive axle 24A and 24B, respectively. The motors 16B and 16C may have a corresponding torque converter 14B and 14C in some embodiments, with the torque converters 14B and 14C possibly controlled in the same or a similar manner as the torque converter 14 described in detail herein. Although omitted for illustrative clarity, individual wheel motors may be operatively connected to or integrated with the road wheels 11 in other embodiments to enable wheel-based propulsion, e.g., in lieu of the illustrated axle-based propulsion. Thus, the various propulsion actuators of FIG. 1 may be used together, alone, or in different locations of the electrified powertrain system 12 within the scope of the disclosure.

For a polyphase/alternating current (AC) embodiment of the electric traction motor 16A, the powertrain system 12 includes a power inverter module ($PIM_A$) 25A connected to the motor 16A via an AC voltage bus 28. The AC voltage bus 28 provides an AC voltage (VAC) to the stator 16S. Power is supplied to a direct current (DC) side of the same PIM 25A by a DC voltage bus 26. The DC voltage bus 26 carries a DC voltage (VDC), and thus is connected to an onboard voltage supply 35, in this instance an exemplary rechargeable high-voltage battery pack ($B_{HV}$) having a lithium-ion or other suitable electrochemical composition. As the voltage capability of the voltage supply 35 is typically much higher than auxiliary 12-15 V auxiliary voltage levels, e.g., 60 V-300 V or more, the powertrain system 12 may also be equipped with a DC-to-DC converter (not shown), which in turn is connected to a 12-15 V auxiliary battery, typically a lead-acid battery. As the DC-DC converter and the auxiliary battery are well understood in the art, these components are omitted from FIG. 1 for illustrative simplicity. For electric axle-driven or wheel-driven implementations, the motors 16B and 16C may be connected to the voltage supply 35 by similarly configured power inverter modules ($PIM_B$ and $PIM_C$) 25B and 25C.

The controller 50 of FIG. 1 is equipped with application-specific amounts of the volatile and non-volatile memory (M) 54 embodied as a computer-readable storage medium, and one or more of processor(s) 52, e.g., microprocessors or central processing units, as well as other associated hardware and software, for instance a digital clock or timer, input/output circuitry, buffer circuitry, Application Specific Integrated Circuits (ASICs), systems-on-a-chip (SoCs), electronic circuits, and other requisite hardware as needed to provide the programmed functionality. In the context of the present disclosure, the controller 50 executes instructions via the processor(s) 52 to cause the controller 50 to perform the present control strategy.

Figure 2:
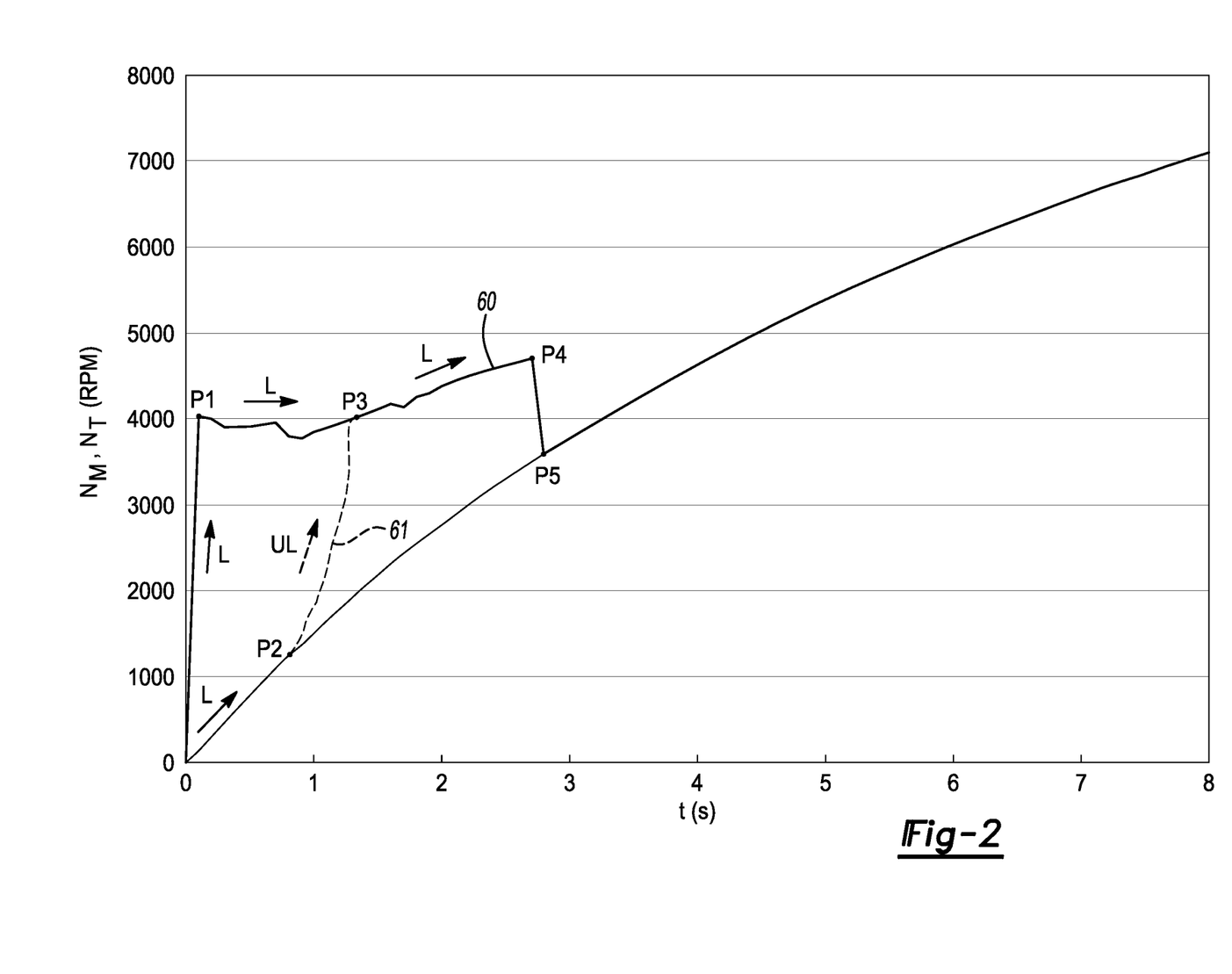
FIG. 2 is a time plot of representative motor ramp-up speeds for control of the traction motor depicted in FIG. 1, with time in seconds depicted on the horizontal axis and motor speed in revolutions per minute (RPM) depicted on the vertical axis.

Referring to FIG. 2, as part of its programmed functionality the controller 50 is configured to execute a "spin-up" strategy in which the electric traction motor 16A is accelerated according to a predetermined speed profile or acceleration trajectory, which in turn accelerates the pump 14P and turbine 14T of the torque converter 14. The degree to which the turbine 14T is accelerated depends on the locked/unlocked state of the TCC 14C and the level of fluid coupling across the torque converter 14. If the motor vehicle 10 of FIG. 1 is stationary, for instance, the controller 50, using the torque converter control signals (arrow $CC_{14}$), may initially command the TCC 14C to transition to a locked state. This occurs at t = 0 in FIG. 2. When the TCC 14C is in the locked state, the pump 14P and the turbine 14T are locked together and thus rotate slip-free at a common speed, i.e., at the motor speed, as appreciated in the art.

Two exemplary motor speed traces 60 and 61 are depicted in FIG. 2 for the purpose of illustration. With the TCC 14C of FIGS. 1 and 1A in a locked state, the controller 50 transmits the motor control signals (arrow $CC_{16}$) to the electric traction motor 16A, e.g., to resident motor controller processor thereof, or other associated control logic. This control action causes the pump 14P to spin up as quickly as possible to a target motor speed ($N_{TGT}$), with the target motor speed ($N_{TGT}$) coinciding with a first target point P1. The spin-up rate used at this early stage of speed control is based on the request signal (arrow $CC_R$) of FIG. 1, which includes an operator requested or autonomously requested output torque.

In the event the motor vehicle 10 is moving and the TCC 14C is currently in a locked state (L), however, the controller 50 may take a different approach during a speed control mode of the electric traction motor 16A and/or timing of transitions between the locked/unlocked states of the TCC 14C. For example, an operator of the motor vehicle 10 may slowly accelerate from a standstill with light pedal pressure until a time coinciding with a second target point P2, with the operator thereafter executing a tip-in event, e.g., by applying a greater pedal force. Such an event is indicated by trace 61 between the second target point P2 and a third target point P3. In this instance, the controller 50 unlocks the TCC 14C of FIG. 1 via the torque converter control signals (arrow $CC_{14}$), with the unlocked state indicated by UL in FIG. 2.

The controller 50 shown in FIGS. 1 and 1A thereafter accelerates the electric traction motor 16A to the target motor speed ($N_{TGT}$). The target motor speed ($N_{TGT}$) corresponds to the predetermined vehicle acceleration rate 56 noted above, at which an output torque achievable by the torque converter 14 when the TCC 14C is in the unlocked state exceeds an output torque achievable by the torque converter 14 when the TCC 14C is in a locked state. Acceleration at this rate continues until the target speed ($N_{TGT}$) corresponding to the third target point P3, with the controller 50 achieving this result via the motor control signals (arrow $CC_{16}$) as noted above. Acceleration of the motor 16A may continue until a fourth target speed point P4 is reached at a later point in time, with the fourth target point P4 corresponding to the desired torque request from the request signals (arrow $CC_R$). The controller 50 thereafter commands the TCC 14C to fully apply/lock, if the TCC 14C is not already in the locked state, with the transition between unlocked and locked states being completed by a fifth target point P5.

The rate of acceleration or speed profile of the electric traction motor 16A, being powered as it is by the voltage supply 35 of FIG. 1, e.g., a propulsion/traction battery pack, is limited by available battery power. The motor 16A may remain in torque control mode at this point, as opposed to speed control mode, i.e., with the controller 50 regulating output torque to conform to a commanded torque as opposed to tracking to the target speed ($N_{TGT}$), and can use calculations to determine the required additional torque that may be needed to achieve a desired vehicle speed. Alternatively, the controller 50 may switch the motor 16A to speed control mode and the corresponding control to the target speed ($N_{TGT}$) if it is advantageous to do so from a performance, system loss, and/or efficiency standpoint. Thus, during launch of the motor vehicle 10 or at other times when a torque request exceeds the torque capability of the motor 16A, and informed by battery power limits, the controller 50 selectively unlocks the TCC 14C at the target speed ($N_{TGT}$) and uses the available torque multiplying capability of the torque converter 14 to achieve the above-noted advantages.

Referring briefly to FIG. 3, a baseline motor speed trajectory 70 is provided by the electric traction motor 16A when the TCC 14C of FIG. 1 is locked, i.e., when the turbine speed ($N_T$) equals the motor speed ($N_M$). Speed trajectory 70 is the baseline that would otherwise be present in a hypothetical powertrain system lacking the torque converter 14 of FIG. 1. Motor speed trajectories 72 represent several different exemplary speed profiles for the predetermined vehicle acceleration rates 56. Also shown in FIG. 3 are corresponding turbine speed trajectories 172. Starting at t = 0, e.g., at launch, a range of speeds thus exists for which locked and unlocked states of the TCC 14C of FIG. 1 could produce similar results, i.e., from an optimization standpoint. This so-called "chatter region" 75 is indicated in FIG. 3 by a characteristic sawtooth pattern. In this region, in other words, the controller 50 is neutral as to whether it is better to lock or unlock the TCC 14C. Steps are therefore taken herein in logic of the controller 50 to avoid alternating between the two possible apply states, with an exemplary hysteresis approach described below.

As part of the present solution, the controller 50 may use one or more system models to determine a qualitatively "best" motor speed trajectory 72 or profile for the electric traction motor 16A. This occurs based on a requested vehicle acceleration rate. For instance, the controller 50 may consider the full range of travel of the accelerator pedal 19 of FIG. 1 as corresponding to a 0% requested vehicle acceleration rate to a 100% requested vehicle acceleration rate. Each corresponding pedal position in turn may be assigned a corresponding vehicle acceleration rate, e.g., 10% pedal position or travel may correspond to 1 m/s$^2$, 20% may correspond to 3 m/s$^2$, and so forth. In terms of the best or optimal trajectory for a given pedal position, the controller 50 may employ various optimization strategies, such as a cost function minimizing total system losses while achieving a desired output torque. Pedal position or travel-specific speed profiles and corresponding target speeds may be programmed in memory 54 of the controller 50, e.g., as one or more lookup tables, and used by the controller 50 in the course of performing the method 100 of FIG. 1.

At or below a given speed trajectory 72, the controller 50 may command the TCC 14C of FIG. 1 to remain locked. The corresponding target speed at which to unlock the TCC 14C is based on a particular motor speed profile at which the same output torque is achievable by locking the TCC 14C or unlocking it, i.e., operation in the chatter region 75. The controller 50 thus maintains a locked state of the TCC 14C at low vehicle speeds, and also during periods of rapid acceleration where the motor 16A is capable of providing the requested output torque, and likewise has the requisite battery power to do so.

Referring to FIG. 4, the method 100 for controlling the above-described apply state and motor speed ($N_M$) of the electric traction motor 16A considers that torque demand will either fall within or equal a peak torque envelope of the motor 16A. If the latter, use of the torque converter 14 will be ineffective since the motor 16A in this case would be power-limited. The controller 50 in executing the method 100 thus reserves torque multiplication capabilities of the torque converter 14 to situations where the benefits of unlocking the TCC 14C outweigh the attendant losses and other inefficiencies.

In a general implementation, the method 100 includes receiving, via the controller 50, the request signal (arrow $CC_R$) indicative of a requested output torque of the EDU 13, e.g., of a motor vehicle having the EDU 13, and accelerating the electric traction motor 16A to the target motor speed ($N_{TGT}$) corresponding to the predetermined vehicle acceleration rate 56, e.g., as shown in FIG. 3. The target motor speed ($N_{TGT}$) and its corresponding vehicle acceleration rate 56 are configured to minimize total system losses of the EDU 13 while still achieving the requested output torque ($T_O$). When the vehicle acceleration rate 56 remains below the calibrated acceleration threshold 57 and the turbine speed ($N_T$) of the torque converter 14 is less than the corner speed ($N_C$) 55 of the motor 16A, the controller 50 commands the TCC 14C of the torque converter 14 to transition to or remain in a locked state. Additionally, the controller 50 commands the TCC 14C to transition to an unlocked state to allow the motor 16A to reach the target speed ($N_{TGT}$), thereby selectively enabling multiplication of the input torque (arrow $T_I$) from the motor 16A when operating at the target speed ($N_{TGT}$), which is part of the optimal speed trajectory 72 for the requested vehicle acceleration.

An exemplary embodiment commences at block B102 ("REC $CC_R$") with the controller 50 of FIG. 1 receiving the request signals (arrow $CC_R$). For the purposes of the method 100, the request signals (arrow $CC_R$) include an output power request, abbreviated below as $P_O$, and a current speed ($N_{10}$) of the motor vehicle 10. Such values are measured and monitored by the controller 50 as part of its ordinary programmed functionality, and available over a controller area network or other vehicle communications system as will be appreciated by those skilled in the art. The method 100 then proceeds to block B105.

At block B104 ("CALC $N_T$"), the controller 50 next calculates an equivalent turbine speed ($N_T$) using the values determined in block B102, before proceeding to block B106. That is, the controller 50 calculates the speed that the turbine 14T of the torque converter 14 shown in FIG. 1 attains to meet the particular torque request communicated via the request signals (arrow $CC_R$) from block B102.

At block B104 ("CALC $N_{TP}$"), the controller 50 calculates a predicted turbine speed ($N_{TP}$) using the values determined in block B102, before proceeding to block B126. That is, the controller 50 calculates the speed that the turbine 14T of the torque converter 14 shown in FIG. 1 will attain to minimize the torque disturbance in the output torque To when the TCC 14 closes. Block B104 transfers control to block 126.

At block B105 ($N_T \geq N_C$?") the measured turbine speed ($N_T$) is compared with the motor corner speed ($N_C$) of the electric traction motor 16A, which is a function of the system battery voltage. As appreciated in the art, for a torque-speed curve of a given electric machine, e.g., the motor 16A, there exists a speed — the corner speed $N_C$ — at which output torque peaks or declines regardless of an increase in speed of the motor 16A. When performing block B105, therefore, the controller 50 may reference one or more lookup tables or otherwise access information describing the torque-speed relationship of the particular configuration of the motor 16A. The method 100 proceeds to block B107 when the turbine speed ($N_T$) exceeds the corner speed ($N_C$), and to block B108 in the alternative when the corner speed ($N_C$) exceeds the turbine speed ($N_T$).

Block B106 ("TCC = L") of FIG. 4 entails locking the TCC 14C. To achieve this result, the controller 50 transmits the corresponding torque converter control signal (arrow $CC_{14}$) of FIG. 1 to the torque converter 14, or more precisely to a resident hydraulic piston or an electrical clutch actuator mechanism thereof (not shown). The method 100 then returns to block B102.

Block B107 ("TCC U?") determines the present locked/unlocked state of the TCC 14. If the TCC 14C is already locked, control passes to block B106. If block B107 detects that the TCC 14 is unlocked, however, control is transferred to block B104.

At block B108 ("$N_M \geq N_C$?"), the controller 50 of FIG. 1 determines if the motor speed ($N_M$) exceeds the motor corner speed ($N_C$). This condition can result when the TCC 14C is open and the electric traction motor 16A is following a desired speed profile dictated by the method 100. If motor speed ($N_M$) equals or exceeds the corner speed ($N_C$), the controller 50 responds by transferring control to block B107 to start the process of locking the TCC 14C.

At block B109 ("$P_O < MIN(P_M, P_B)$)", the controller 50 of FIG. 1 next compares requested output power ($P_O$) from the electric traction motor 16A to the minimum of (i) the current maximum motor power ($P_M$), and (ii) the current maximum battery power ($P_B$). The method 100 proceeds to block B110 when the requested output power is less than the minimum of the two relevant comparison values, and to block B107 in the alternative when the output power exceeds the minimum of (i) and (ii).

At block B110 ("$T_O < T_{UL}$"), the controller 50 shown in FIG. 1 compares the requested output torque ($T_O$) to a calibrated torque threshold ($T_{UL}$) for unlocking the TCC 14C. The method 100 proceeds to block B112 when the output torque ($T_O$) exceeds the calibrated torque threshold ($T_{UL}$), and to block B107 in the alternative when the output torque ($T_O$) does not exceed the calibrated torque threshold ($T_{UL}$).

Block B112 ("TCC = UL") of the method 100 entails unlocking the TCC 14C if the TCC 14C is not already in the unlocked state. As noted above, the controller 50 commands the locked/unlocked state of the TCC 14C via the control signals (arrow $CC_{14}$). The method 100 thereafter proceeds to block B114.

Block B114 ("DET $N_{TGT}$") entails determining the target motor speed ($N_{TGT}$) for the present vehicle acceleration rate. As described above with reference to the example motor speed trajectories 72 of FIG. 3, for instance, the controller 50 may reference a lookup table or other calibrated information to determine the target motor speed ($N_{TGT}$). The method 100 then proceeds to block B116.

At block B116 ("SC; $N_{10} = 0$?"), the controller 50 next transitions to speed control mode of the motor 16A if the controller 50 is not already operating in this mode. As appreciated in the art, speed of a rotary electric machine is proportional to voltage when the load on the machine is constant. Thus, speed control involves controlling the voltage supply to the motor 16A to achieve the target motor speed ($N_{TGT}$) at the defined speed profile. The controller 50 then determines if the motor vehicle 10 of FIG. 1 is stationary, i.e., whether $N_{10} = 0$, such as by processing speed signals from one or more wheel speed or transmission output speed sensors (not shown). The method 100 proceeds to block B118 if the motor vehicle 10 is stationary, and otherwise proceeds to block B120.

Block B118 ("RMP=MAX") includes linearly increasing or ramping the motor speed ($N_M$) at a maximum ramp rate, i.e., a predetermined maximum rate at which the electric traction motor 16A is capable of accelerating based on the particular configuration of the motor 16A, battery power limits, etc. Block B118 continues in a loop with block B129A, with the method 100 proceeding to block B124 when the target motor speed ($N_{TGT}$) has been reached.

Block B120 ("$N_M \neq N_{TGT}$?") includes determining via the controller 50 whether the motor speed ($N_M$) and the target motor speed ($N_{TGT}$) are not equal. The method 100 proceeds to block B122 when the two values are equal, and to block B124 when the motor speed ($N_M$) does not equal the target motor speed ($N_{TGT}$).

Block B122 ("RMP =$f(X)$") includes ramping the motor speed ($N_M$) at a calibrated ramp rate, which for the purposes of block B122 may be a function, i.e., $f(X)$, of a difference between the current motor speed and the target motor speed ($N_{TGT}$), and/or a difference between the maximum required battery power and the current battery power. The method 100 then proceeds to block B124.

Block B124 ("$N_M = N_{TGT}$") includes setting the motor speed ($N_M$) to the target motor speed ($N_{TGT}$) while operating in the speed control mode before proceeding to block B106. Torque demand either falls within or equals a peak torque envelope of the electric traction motor 16A or equals the peak torque. If the latter, use of the torque converter 14 will not be effective since the traction motor 16A is power-limited.

At block B126 ("Set $N_{TGT} = N_{TP}$"), the controller 50 sets the new target motor speed $N_{TGT}$ to the predicted turbine speed $N_{TP}$ from block B104 and advances to block B127.

At block B127 ("RMP = $f(dTo/dt)$", the controller 50 next estimates the required motor speed change when ramping to achieve the target motor speed ($N_{TGT}$), and provides limits on the ramping rate so as to minimize the torque disturbance in the output torque ($T_O$). Block B127 loops with block B129B until the motor speed reaches the target motor speed, i.e., $N_M = N_{TGT}$. Control is then passed to block B106.

Blocks B129A and B129B verify whether respective blocks B118 and B122 have met their speed targets, e.g., using a comparator circuit.

Figure 5:
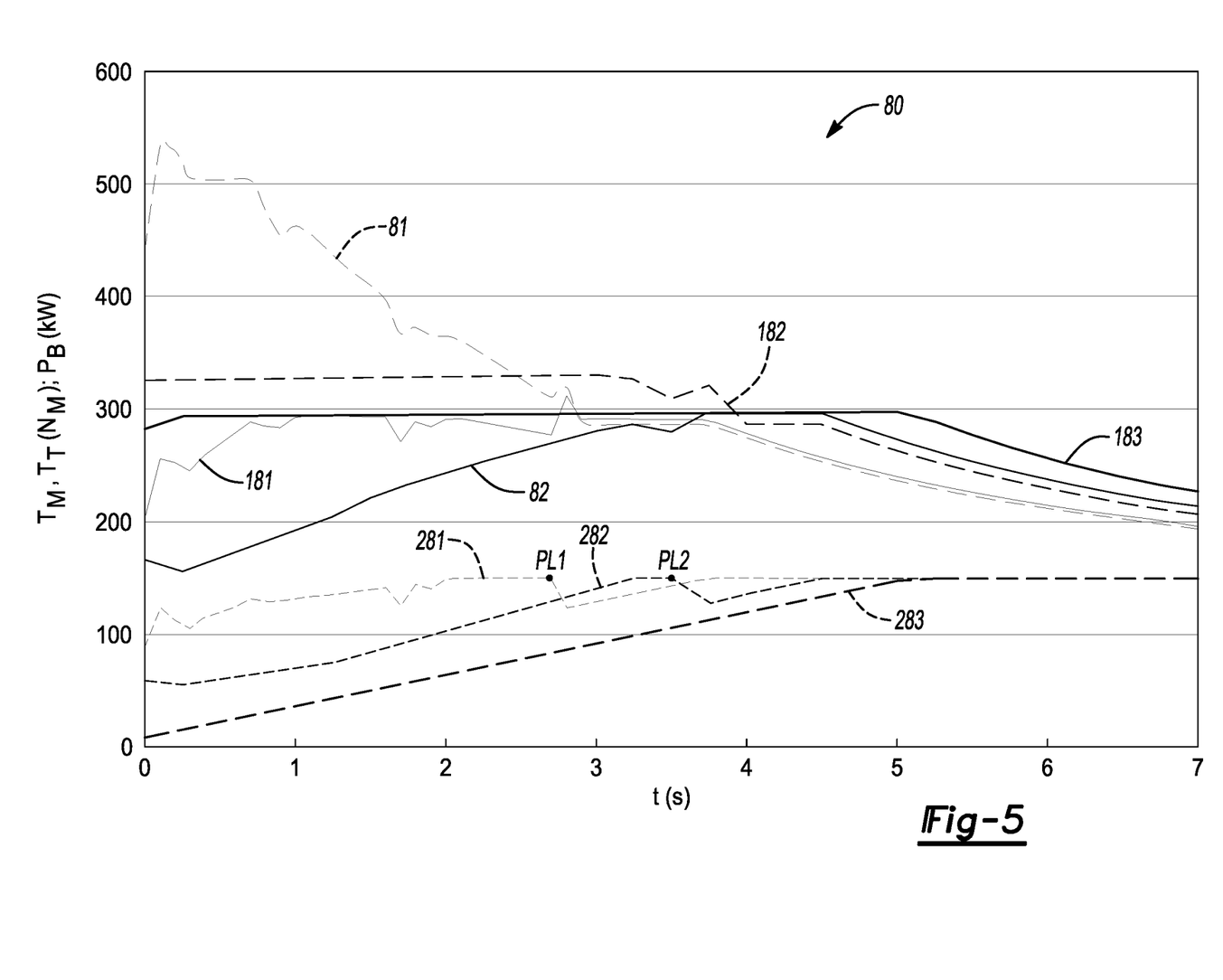
FIG. 5 is a time plot of representative motor and turbine torques and battery power for control of the powertrain system depicted in FIG. 1, with time in seconds depicted on the horizontal axis, and battery power in kilowatts (kW) and torque in Newton-meters (Nm) depicted on the vertical axis.

Referring now to FIG. 5, a plot 80 shows selected equivalent motor and turbine torques for various motor speed trajectories, as well as corresponding battery power limits, when the electric traction motor 16A is running in speed control mode. Traces 81 and 82 represent turbine torque levels for representative cases. Traces 181 and 182 represent corresponding motor torque levels for the same cases, with trace 183 showing motor torque for the motor 16A, i.e., absent the torque converter 14. Corresponding traces 281 and 282 represent the batter power ($P_{BAT}$), with trace 282 once again being a reference trace corresponding to maximum torque with the TCC 14C locked.

The optimal lockup point for the TCC 14C is defined as the point of achieving peak battery power, or peak motor power if lower than the peak battery power. Torque multiplication by the torque converter 14 of FIG. 1 is possible when the available battery power exceeds the requested output power, i.e., $P_{BAT} > P_O$. Battery power in excess of the requested output power thus acts as a power reserve that, in turn, could be used by the controller 50 to offset some of the power losses in the torque converter 14.

To avoid a sharp perceptible drop in motor speed ($N_M$) during the lockup period, the controller 50 may automatically adjust a lockup point initially determined from pure optimization. That is, using a cost optimization analysis, the controller 50 may initially determine an optimal lockup point for a given acceleration rate 56. The optimal lockup point occurs when the battery has reached peak power and the turbine output torque falls below the maximum achievable motor torque, e.g., points PL1 and PL2. The controller 50 may adjust the lockup point to a slightly later time to avoid noise, vibration, and harshness. One way of doing this is to institute a hysteresis control band, applying the TCC 14C at the most power-efficient points along a given speed profile before lockup of the TCC 14C occurs. For instance, when the TCC 14C is in the locked state, applying the hysteresis band 58 below a predetermined speed of the electric traction motor 16A would help prevent the TCC 14C from transitioning from the locked state to the unlocked state while the motor 16A operates within the hysteresis band. This in turn may help the controller 50 avoid frequent opening and closing of the TCC 14C.

Figure 6:
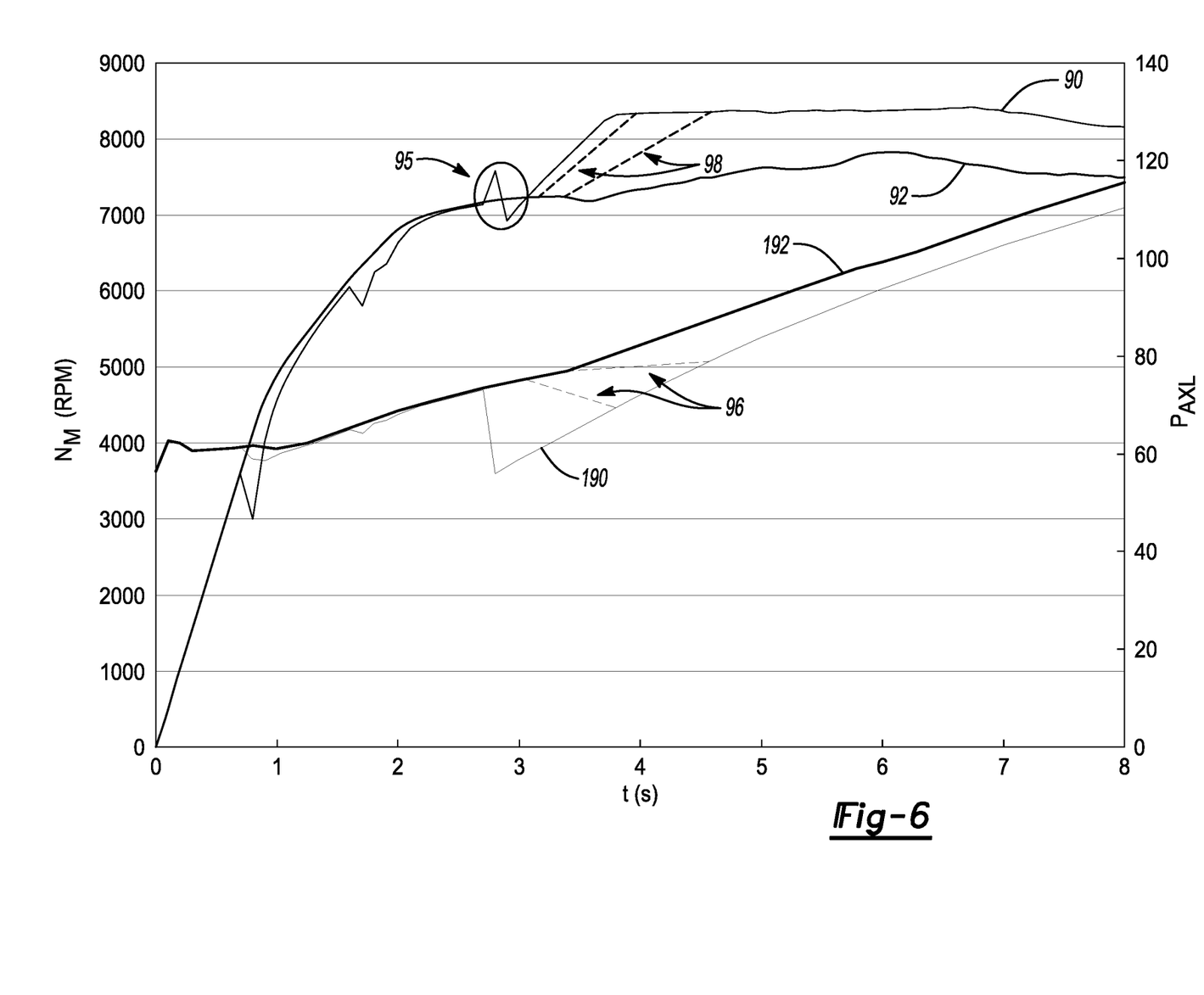
FIG. 6 is a comparative plot of representative motor speeds, with time in seconds depicted on the horizontal axis and motor speed in RPM depicted on the vertical axis.

Referring to FIG. 6, and further with respect to the above-described lockup control of the TCC 14C shown in FIG. 1, the controller 50 may use the same optimization strategy to determine a motor speed trajectory and target motor speed ($N_{TGT}$) that minimizes total system losses when the TCC 14C is unlocked, i.e., in torque converter mode when multiplying torque from the traction motor 16A. In FIG. 6, which illustrates motor speed ($N_M$) in RPM and axle power ($P_{AXL}$) in kW on the vertical axes and time in seconds (s) on the horizontal axis for a representative embodiment of the motor vehicle 10, trajectory 90 corresponds to early lockup axle power, while trajectory 92 corresponds to axle power absent lockup of the TCC 14C. Also shown in FIG. 6 is the corresponding speed trajectories 190 and 192 for the early lockup and no lockup examples.

As shown at region 95, early lockup may lead to a perceptible driveline torque disturbance. The corresponding drop in motor speed is seen in trajectory 190. The controller 50 thus avoids such disturbances by setting the lockup point slightly later in time, such that the controller 50 follows one of the alternative trajectories 96, which in turn enable trajectories 98 for ensuring a more gradual rise in lockup axle power. The motor speed trajectory located nearest the optimal lockup point, e.g., derived using optimization calculations as noted above, such as based on peak battery power, may be interpolated based on the current turbine speed. Tradeoffs are thus made by the controller 50 as needed between the resulting torque disturbances due to lockup-induced motor deceleration and the different available axle power transitions of trajectories 98.

Those skilled in the art in view of the forgoing disclosure will appreciate that the method 100 may be alternatively implemented in computer-readable storage medium form, e.g., the memory 54 of FIG. 1, on which instructions are recorded for controlling the EDU 13. In such an embodiment, execution of the instructions by the processor 52 causes the processor 52 to receive the request signal (arrow $CC_R$) indicative of the requested output torque (arrow $T_O$) of the EDU 13. Execution of the instructions also causes the controller 50 to accelerate the electric traction motor 16A to the target motor speed ($N_{TGT}$) at a given speed profile, with the predetermined target motor speed ($N_{TGT}$) being configured to minimize total system losses of the EDU 13 while achieving the requested output torque.

Moreover, execution of the instructions causes the controller 50 or the processor 52 thereof to command the TCC 14C to transition to or remain in a locked state when the optimal vehicle acceleration rate remains below the calibrated acceleration threshold 57, and a turbine speed ($N_T$) of the torque converter 14 is less than the corner speed ($N_C$) 55 of the electric traction motor 16A. The controller 50 is also caused to command the TCC 14C to transition to an unlocked state upon reaching the target speed ($N_{TGT}$), thereby selectively enabling multiplication of the input torque (arrow $T_I$) from the motor 16A when operating at the target speed ($N_{TGT}$).

In some implementations of the computer-readable storage medium or memory 54, the execution of the instructions causes the processor 52 to maintain the TCC 14C in the locked state when the motor 16A operates below a peak motor torque, and to unlock the TCC 14C when the requested output torque exceeds the peak motor torque.

Using the method 100 as set forth above, the controller 50 is able to select an optimal motor speed trajectory or profile when operating in a speed control mode. The controller 50 may do so for different vehicle acceleration rates in a manner that minimizes overall system losses and improves drive quality, while at the same time achieving a desired output torque. Thus, the present teachings improve the performance benefits of adding the motor-driven torque converter 14 to the powertrain system 12 by controlling the electric traction motor 16A or its variants and TCC 14C in a well-coordinated manner. These and other benefits will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for controlling an electric drive unit (EDU) of a motor vehicle, the EDU having a torque converter connected to an electric traction motor such that a pump of the torque converter is driven by an output member of the electric traction motor, the method comprising:
   receiving, via a controller, a request signal indicative of a requested output torque of the EDU;
   accelerating the electric traction motor to a target motor speed at a calibrated speed profile, the calibrated speed profile corresponding to a predetermined vehicle acceleration rate, wherein the calibrated speed profile and the target motor speed are configured to minimize total system losses of the EDU while achieving the requested output torque;
   when the predetermined vehicle acceleration rate remains below a calibrated acceleration threshold and a turbine speed of a turbine of the torque converter is less than a corner speed of the electric traction motor, commanding a torque converter clutch (TCC) of the torque converter to transition to or remain in a locked state; and
   commanding the TCC to transition to an unlocked state from the locked state to reach the target motor speed, thereby selectively enabling multiplication of an input torque from the electric traction motor when operating at the target motor speed, wherein the target motor speed corresponds to an actual output torque that is achievable by the torque converter when the TCC is in the unlocked state being equal to an actual output torque achievable by the torque converter when the TCC is in the locked state.

2. The method of claim 1, wherein receiving the request signal includes receiving a pedal position signal indicative of a percentage of apply force or travel of an accelerator pedal of the motor vehicle.

3. The method of claim 2, further comprising extracting the target motor speed, via the controller, from a lookup table indexed by the pedal position.

4. The method of claim 1, further comprising:
when the TCC is in the locked state, applying a hysteresis band below a predetermined speed of the electric traction motor to prevent the TCC from transitioning from the locked state to the unlocked state while the electric traction motor operates within the hysteresis band.

5. The method of claim 1, the method further comprising:
determining if the motor vehicle is stationary or moving; and
ramping a rotary speed of the pump of the torque converter to the target motor speed at a first rate or a second rate depending on whether the motor vehicle is stationary or moving, respectively.

6. The method of claim 5, further comprising:
when the motor vehicle is stationary, ramping the rotary speed of the pump of the torque converter to the target motor speed at the first rate, wherein the first rate is a calibrated maximum acceleration rate of the electric traction motor.

7. The method of claim 5, further comprising:
when the motor vehicle is moving, ramping the rotary speed of the pump of the torque converter to the target motor speed at the second rate, wherein the second rate is less than the first rate and is limited by an available battery power level of a propulsion battery connected to the electric traction motor.

8. The method of claim 1, further comprising:
maintaining the TCC in the locked state when the electric traction motor operates below a peak motor torque; and
unlocking the TCC when the requested output torque exceeds the peak motor torque.

9. A powertrain system for a motor vehicle, comprising:
a driven load; and
an electric drive unit (EDU) coupled to the driven load, the EDU comprising:
an electric traction motor operatively connected to the driven load;
a torque converter having a pump and a turbine, wherein the pump is connected to and driven by the electric traction motor; and
a controller in communication with the electric traction motor and the torque converter, wherein the controller is configured to:
receive a request signal indicative of a requested output torque of the EDU;
accelerate the electric traction motor to a target motor speed at a calibrated speed profile, the calibrated speed profile corresponding to a predetermined vehicle acceleration rate, wherein the target motor speed and the calibrated speed profile are configured to minimize total system losses of the EDU while achieving the requested output torque;
command a torque converter clutch (TCC) of the torque converter to transition to or remain in a locked state when the predetermined vehicle acceleration rate remains below a calibrated acceleration threshold and a turbine speed of the turbine of the torque converter is less than a corner speed of the electric traction motor; and
command the TCC to transition to an unlocked state to reach the target motor speed, thereby selectively enabling multiplication of an input torque from the electric traction motor when operating at the target motor speed, wherein the calibrated acceleration threshold is a predetermined vehicle acceleration rate at which an output torque achievable by the torque converter when the TCC is in the unlocked state equals an output torque achievable by the torque converter when the TCC is in the locked state.

10. The powertrain system of claim 9, further comprising an accelerator pedal, wherein the request signal includes a pedal position signal indicative of a percentage of apply force or travel of the accelerator pedal.

11. The powertrain system of claim 10, wherein the controller is configured to extract the target motor speed from a lookup table indexed by a pedal position of the accelerator pedal.

12. The powertrain system of claim 9, wherein the controller is configured to prevent the TCC from transitioning from the locked state to the unlocked state while the electric traction motor operates within a hysteresis band.

13. The powertrain system of claim 9, wherein the driven load includes one or more road wheels of the motor vehicle, and the EDU is used aboard the motor vehicle to power a vehicle propulsion function thereof.

14. The powertrain system of claim 13, wherein the controller is configured to determine if the motor vehicle is stationary or moving, and to thereafter ramp a rotary speed of the pump of the torque converter to the target motor speed at a first rate or a second rate depending on whether the motor vehicle is stationary or moving, respectively.

15. The powertrain system of claim 14, wherein when the motor vehicle is stationary, the controller is configured to ramp the rotary speed of the pump of the torque converter to the target motor speed at the first rate, and wherein the first rate is a calibrated maximum acceleration rate of the electric traction motor.

16. The powertrain system of claim 14, wherein when the motor vehicle is moving, the controller is configured to ramp the rotary speed of the pump of the torque converter to the target motor speed at the second rate, wherein the second rate is less than the first rate and is limited by an available battery power level of a propulsion battery connected to the electric traction motor.

17. A computer-readable storage medium on which instructions are recorded for controlling an electric drive unit (EDU) having a torque converter connected to an electric traction motor, such that a pump of the torque converter is driven by an output member of the electric traction motor, wherein execution of the instructions by a processor causes the processor to:
receive a request signal indicative of a requested output torque of the EDU;
accelerate the electric traction motor to a predetermined target motor speed at a predetermined speed profile, the predetermined speed profile corresponding to a predetermined vehicle acceleration rate, wherein the predetermined target speed and the calibrated speed profile are configured to minimize total system losses of the EDU while achieving the requested output torque;
command a torque converter clutch (TCC) of the torque converter to transition to or remain in a locked state when the predetermined vehicle acceleration rate remains below a calibrated acceleration threshold and a turbine speed of the torque converter is less than a corner speed of the electric traction motor; and
command the TCC to transition to an unlocked state to reach the target motor speed, thereby selectively enabling multiplication of an input torque from the electric traction motor when operating at the target motor speed, wherein the calibrated acceleration threshold is a predetermined vehicle acceleration rate at which an output torque achievable by the torque converter when the TCC is in the unlocked state equals an output torque achievable by the torque converter when the TCC is in the locked state.

18. The computer-readable storage medium of claim 17, wherein the execution of the instructions causes the processor to maintain the TCC in the locked state when the electric traction motor operates below a peak motor torque, and to unlock the TCC only when the requested output torque exceeds the peak motor torque.

19. The computer-readable storage medium of claim 17, wherein the execution of the instructions causes the processor to prevent the TCC from transitioning from the locked state to the unlocked state while the electric traction motor operates within a hysteresis band of the electric traction motor.

20. The computer-readable storage medium of claim 17, wherein the EDU is part of a motor vehicle, and wherein the execution of the instructions causes the processor to determine if the motor vehicle is stationary or moving, and to thereafter ramp a rotary speed of the pump of the torque converter to the target motor speed at a first rate or a second rate depending on whether the motor vehicle is stationary or moving, respectively.

\* \* \* \* \*